US006785039B2

(12) United States Patent
Wendland, Jr.

(10) Patent No.: US 6,785,039 B2
(45) Date of Patent: Aug. 31, 2004

(54) OPTICAL ROUTING ELEMENTS

(75) Inventor: Ronald G. Wendland, Jr., LaFayette, CO (US)

(73) Assignee: PTS Corporation, San Jose, CA (US)

(*) Notice: Subject to any disclaimer, the term of this patent is extended or adjusted under 35 U.S.C. 154(b) by 119 days.

(21) Appl. No.: 10/161,838

(22) Filed: Jun. 3, 2002

(65) Prior Publication Data

US 2003/0223677 A1 Dec. 4, 2003

(51) Int. Cl.[7] .............................................. G02B 26/00
(52) U.S. Cl. ...................................... 359/290; 359/223
(58) Field of Search ................................. 359/223, 290, 359/291, 298, 295, 292, 225, 229, 224; 345/84, 85

(56) References Cited

U.S. PATENT DOCUMENTS

| | | | |
|---|---|---|---|
| 4,330,175 A | 5/1982 | Fujii et al. ................... 359/571 |
| 5,212,582 A | 5/1993 | Nelson ........................ 359/224 |
| 5,279,924 A | 1/1994 | Sakai et al. .................. 430/290 |
| 5,414,540 A | 5/1995 | Patel et al. .................. 349/196 |
| 5,600,383 A | 2/1997 | Hornbeck ..................... 348/771 |
| 5,917,625 A | 6/1999 | Ogusu et al. .................. 385/24 |
| 5,960,133 A | 9/1999 | Tomlinson .................... 385/18 |
| 5,999,288 A | 12/1999 | Ellinas et al. ................. 398/59 |
| 5,999,672 A | 12/1999 | Hunter et al. ................. 385/37 |
| 6,028,689 A | 2/2000 | Michalicek et al. ......... 359/224 |
| 6,040,935 A | 3/2000 | Michalicek ................. 359/198 |
| 6,097,519 A | 8/2000 | Ford ............................. 398/1 |
| 6,097,859 A | 8/2000 | Solgaard ...................... 385/17 |
| 6,097,863 A | 8/2000 | Chowdhury .................. 385/37 |
| 6,108,471 A | 8/2000 | Zhang et al. ................... 385/37 |
| 6,128,122 A | 10/2000 | Drake et al. ................. 359/224 |
| 6,147,790 A * | 11/2000 | Meier et al. ................. 359/291 |
| 6,253,001 B1 | 6/2001 | Hoen ............................ 385/17 |
| 6,307,657 B1 | 10/2001 | Ford ............................. 398/9 |
| 6,330,102 B1 | 12/2001 | Daneman et al. ............ 359/290 |
| 6,337,760 B1 | 1/2002 | Huibers et al. .............. 359/291 |
| 6,449,096 B1 | 9/2002 | Fabiny et al. ................ 359/571 |
| 6,501,877 B1 | 12/2002 | Weverka et al. .............. 385/31 |
| 6,608,712 B2 * | 8/2003 | Michalicek .................. 359/224 |

OTHER PUBLICATIONS

T. Akiyama, et al.; "Controlled Stepwise Motion in Poly-silicon Microstructures," Journal of Microelectromechanical Systems, vol. 2, No. 3, Sep. 1993; pp. 106–110.

C.M.A. Ashruf, et al., Galvanic porous silicon formation without external contacts, Sensors and Actuators 74 (1999) pp. 118–122.

Kenneth Bean, et al., "Anisotropic Etching of Silicon," IEEE Transactions on Electron Devices, vol. Ed–25, No. 10, Oct. 1978.

Dino R. Ciarlo, "A latching accelerometer fabricated by the anisotropic etching of (110) oriented silicon wafers," Lawrence Livermore Nat'l Laboratory, Mar. 1, 1992.

(List continued on next page.)

*Primary Examiner*—Georgia Epps
*Assistant Examiner*—M. Hasan
(74) *Attorney, Agent, or Firm*—Townsend and Townsend and Crew, LLP

(57) ABSTRACT

The present invention provides improved MEMS devices and methods for use with fiber-optic communications systems. In one embodiment, an apparatus (100) for steering light has a base layer (110), a beam layer (114) and a folded flexure assembly (120) coupled therebetween. The folded flexure assembly complete underlies the beam layer, and facilitates rotation of the beam layer relative to the base layer. The flexure assemblies further provide a counter rotation force to help prevent the beam layer from sticking in an actuated position. In one aspect, the base layer includes raised portions (140, 142) which operate as mechanical stops for the beam layer. In this manner, the counter rotation force helps prevent the beam layer from sticking to the base layer or the raised portions.

37 Claims, 8 Drawing Sheets

OTHER PUBLICATIONS

A.S. Dewa, et al., "Development of a Silicon Two–Axis Micromirror for an Optical CrossConnect," Solid State Sensors and Actuators Workshop, Hilton Head, South Carolina, pp. 93–96.

Joseph Ford et al., "Wavelength Add Drop Switching Using Tilting Micromirrors," Journal of Lightwave Technology, vol. 17, No. 5, May 1999.

J. Grade et al., A Large–Deflection Electrostatic Actuator for Optical Switching Applications, Solid–State Sensor and Actuator Workshop, Hilton Head Island, South Carolina, Jun. 4–8, 2000; pp. 97–100.

Robert E. Hopkins, *Some Thoughts On Lens Mounting*, Optical Engineering, Sep.–Oct. 1976, vol. 15, No. 5, pp. 428–430.

V. Kaajakari et al.; "Ultrasonic Actuation for MEMS Dormancy–Related Stiction Reduction," In MEMS Reliability for Critical Applications, Proceedings of SAPIE vol. 4180 (2000); pp. 60–65.

T.L. Koch et al., "Anisotropically etched deep gratings for InP/InGaAsP optical devices," J.App. Phys. 62 (8), Oct. 15, 1987.

I. Nishi et al., "Broad–Passband–Width Optical Filter for Multi–Demultiplexer Using a Diffraction Grating and a Retroreflector Prism," Electronics Letters, vol. 21, No. 10, May 9, 1985.

P. Phillippe et al., "Wavelength demultiplexer: using echelette gratings on silicon substrate," Applied Optics, vol. 24, No. 7, Apr. 1, 1985.

R. D. Rallison, White Paper on: *Dense Wavelength Division Multiplexing (DWDM) and the Dickson Grating*, Jan. 6, 2001, 9 pages.

M. Schilling et al.; "Deformation–free overgrowth of reactive ion beam etched submicron structures in InP by liquid phase epitaxy," Appl. Phys. Lett. 49 (12), Sep. 22, 1986.

Z. J. Sun et al., Demultiplexer with 120 channels and 0.29–nm Channel Spacing, IEEE Photonics Technology Letters, vol. 10, No. 1, Jan. 1998.

W. Tang, et al., "Electrostatically Balanced Comb Drive for Controlled Levitation," Reprinted from Technical Digest IEEE Solid–State Sensor and Actuator Workshop, Jun. 1990; pp. 198–202.

L. Torcheux et al., "Electrochemical Coupling Effects on the Corrosion of Silicon Samples in HF Solutions," J. Electrochem.Soc., vol. 142, No. 6, Jun. 1995.

P. VanKessel et al., "A MEMS–Based Projection Display," Proceedings of the IEEE, vol. 86, No. 8, Aug. 1998; pp. 1687–1704.

Microfabricated Silicon High Aspect Ratio Flexures for In–Plane Motion; dissertation by C. Keller, Fall 1998.

Gimballed Electrostatic Microactuators with Embedded Interconnects; dissertation by L. Muller; Spring 2000.

*Transducer Elements*, Piezo Systems, Inc., Cambridge MA, Catalog #3, 1998, pp. 30–45.

* cited by examiner

OPTICAL ROUTING ELEMENTS

BACKGROUND OF THE INVENTION

This invention relates generally to the field of micro-electrical-mechanical systems (MEMS), and in particular, to improved MEMS devices and methods of making same for use with fiber-optic communications systems.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called an optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80 channel DWDM system will require thousands of switches to fully cross-connect all the wavelengths. Opto-mechanical switches, which offer acceptable optical specifications are too big, expensive and unreliable for widespread deployment. Improvements are needed to help reliably switch and direct the various wavelengths along their desired paths.

Micro-electrical-mechanical systems (MEMS) theoretically provide small systems capable of providing switching functions. However, MEMS also have difficulties to overcome. For example, flexures that rotate the MEMS mirror typically are located outside the mirror perimeter. As a result, multiple mirrors in an array are not packed as tightly together as desired. Further, the MEMS mirrors tend to stick to the underlying surface when in the actuated positions, hindering their operation. The present invention is, therefore, directed to improved MEMS devices for use with a wide range of OTN equipment, including switches (OXC) and routers.

SUMMARY OF THE INVENTION

The present invention provides improved MEMS devices for use with all optical networks, and methods of using and making same. For example, the present invention may be used with the exemplary wavelength routers described in U.S. Pat. No. 6,501,877, filed Nov. 16, 1999, and issued Dec. 31, 2002, the complete disclosure of which is incorporated herein by reference.

In one embodiment of the present invention, an apparatus for steering light includes a base layer and a folded flexure assembly coupled thereto. A beam layer overlies and is coupled to the folded flexure assembly, with the folded flexure assembly completely underlying the beam layer. The beam layer is adapted to rotate relative to the base layer. In one aspect, the beam layer has a substantially planar upper surface adapted to reflect electromagnetic energy.

In one aspect, the base layer further includes first and second electrically conductive portions that are physically and electrically isolated from each other. The first electrically conductive portion is coupled to a voltage source, with the beam layer adapted to rotate when a voltage is applied to the first electrically conductive portion. In one aspect, the beam layer comprises an electrically conductive material.

In one embodiment, the folded flexure further includes a first arm coupled to the base layer and a second arm coupled to the beam layer. The first and second arms are coupled together, with the coupled portion of the arms disposed between the beam and base layers.

In one aspect, the first and second arms are substantially parallel to each other when the beam layer is in a non-rotated state. In another aspect, the arms are in a non-parallel alignment when the beam layer is in a rotated state. The first and second arms may have, in one embodiment, a thickness between about 0.5 microns and about 2.0 microns. Further, light steering apparatus in other embodiments include a second pair or additional pairs of arms to facilitate beam layer rotation while providing sufficient support thereof.

In one aspect, first and second raised portions are coupled to the base layer. Raised portions may, but need not, extend substantially a full width of the base layer. Raised portions operate as stops, with the beam layer adapted to contact the first and second raised portions when rotated in a first or second direction, respectively. In one aspect, the first and second raised portions are positioned on or in the base layer to define the maximum angles of rotation in the first and second directions. In a particular embodiment, the beam layer has a non-rotated state and a rotated state defining an angle therebetween, with the angle ranging between about one (1) degree and about thirty (30) degrees.

In one embodiment, the folded flexure assembly is adapted to provide a restoring force to the beam layer when the beam layer is in a rotated state. In one aspect, the restoring force is of sufficient strength to prevent the beam layer from sticking to the first and second raised portions, or to the base layer.

In another embodiment, an apparatus for steering light according to the present invention includes a flexure assembly that is adapted to permit an electrode-induced rotation of a beam layer when a voltage is applied, with the flexure assembly further providing a counter-rotation force generally opposite the electrode-induced rotation. In a particular embodiment, the counter-rotation force prevents the beam layer from remaining in a rotated state when the voltage is removed.

In one aspect, the beam layer rotates about an axis of rotation. The flexure assembly further includes a first arm coupled to the base layer on a first side of the axis of rotation, and coupled to the beam layer on a second side of the axis of rotation. A second flexure assembly arm is coupled to the base layer on the second side of the axis of rotation, and is coupled to the beam layer on the first side of the axis of rotation. In this manner, the two arms each provide a rotational force that is generally opposite or counter to the beam layer rotation.

In one aspect, the conductive layer is coupled to a voltage source, with the beam layer being adapted to rotate when a voltage is applied to the conductive layer. In another aspect, the beam layer comprises an electrically conductive material, such as polysilicon, gold or other metals, and the like.

In still another aspect, the beam layer has a non-rotated state and a rotated state defining an angle therebetween, with the angle ranging between about one (1) degree and about thirty (30) degrees. In another aspect, the angle is between about minus one (−1) degree to about minus thirty (−30) degrees. Other angular relationships also are within the scope of the present invention.

In another aspect, the flexure assembly is entirely underlying the beam layer. Such a configuration facilitates tight or close packing of multiple apparatus of the present invention. In alternate embodiments, the flexure assembly comprises a conductive or semi-conductive material, such as polysilicon, metals or the like, or a non-conductive material, such as silicon dioxide and other dielectrics.

In another embodiment, a structure for steering light according to the present invention includes a base, an electrode overlying the base, a flexure assembly and a reflective layer coupled to the flexure assembly. The flexure assembly is adapted to permit the reflective layer to move into a rotated state when a voltage is applied to the electrode, with the rotated state having a portion of the reflective layer contacting the base. The flexure assembly further prevents the reflective layer from remaining in the rotated state when the voltage is removed.

Other objects, features and advantages of the present invention will become more fully apparent from the following detailed description, the appended claims and the accompanying drawings.

DESCRIPTION OF THE SPECIFIC EMBODIMENTS

Turning now to FIGS. 1A–F an embodiment of an apparatus 100 for steering light according to the present invention will be described. Apparatus 100 also may be used as part of optical switches, display devices, signal modulators and the like, including those described in U.S. application Ser. No. 09/442,061, the complete disclosure of which has been previously incorporated herein by reference.

Figure 1A:
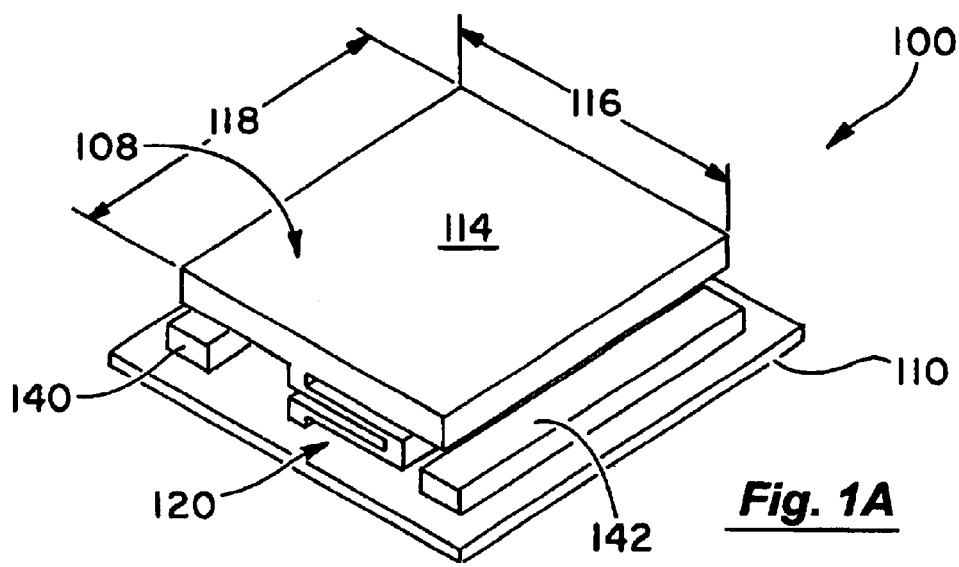
FIG. 1A is a simplified overall view of a light steering apparatus according to an embodiment of the present invention.

Apparatus 100 includes a base layer 110, a beam layer 114 and a flexure assembly 120 as shown in FIG. 1A. Base layer 110 provides a base onto which additional components and layers are formed. In one embodiment, base layer 110 comprises a nitride, such as silicon nitride, and the like. In a particular embodiment, base layer 110 comprises a substrate, such as a silicon substrate, overlaid with an oxide layer, such as a thermal oxide layer, over which is laid a layer of silicon nitride (together shown as base layer 110 in the Figures).

Beam layer 114 is used to reflect electromagnetic energy, such as light, in optical switches, optical routers, and the like. Preferably, beam layer 114 includes a reflective surface and is made from a wide range of materials depending, in part, on the particular application. In some embodiments, beam layer 114 comprises gold, silver, chromium, aluminum, combinations thereof, and the like. In another embodiment, beam layer 114 comprises polysilicon. In still another embodiment, beam layer 114 comprises silicon or polysilicon, over which is laid a reflective coating or surface, such as a gold surface. In one embodiment, beam layer 114 has a width 116 ranging from about twenty-five (25) microns to about one hundred and fifty (150) microns, and a length 118 ranging from about twenty-five (25) microns to about one hundred and fifty (150) microns. In a particular embodiment, beam layer 114 has both a length and a width that is about fifty (50) microns. In one embodiment, beam layer 114 has about the same surface area as base layer 110, although beam layer 114 area may be larger or smaller than base layer 110 area in other embodiments. In one embodiment, beam layer 114 has a thickness 106 that is between about one (1) micron and about ten (10) microns, and is about five (5) microns in a particular embodiment.

Flexure assembly 120 is coupled to both base layer 110 and beam layer 114. In one embodiment, flexure assembly 120 is disposed between base layer 110 and beam layer 114, so that flexure assembly 120 does not extend outside a periphery defined by either layer 110, 114. In this manner, multiple apparatus 100 may be more closely packed together.

Figure 1B:
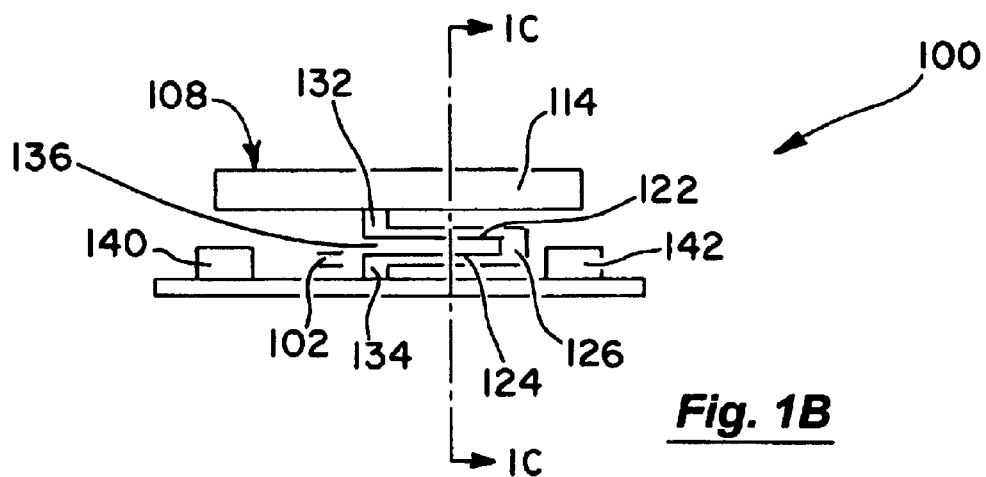
FIGS. 1B and 1C are simplified side and front views of the apparatus of FIG. 1A.
Figure 1C:
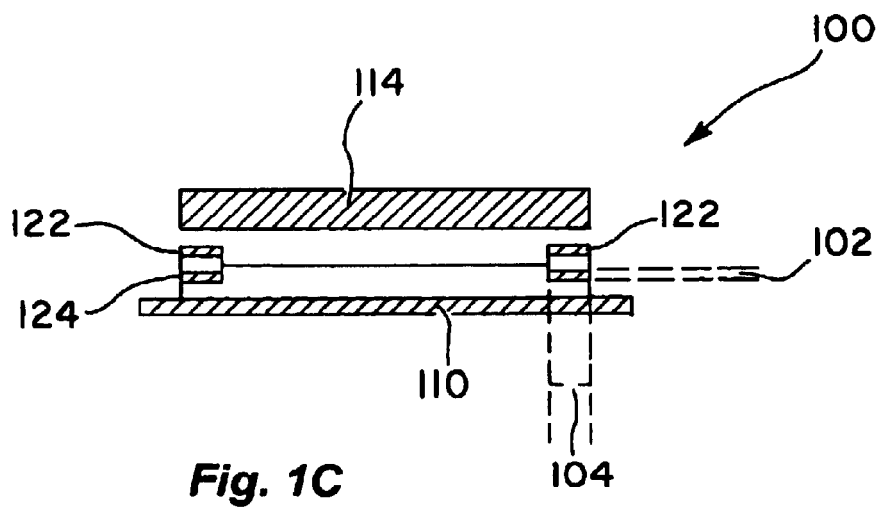

As can be seen in FIGS. 1B and 1C, in one embodiment flexure assembly 120 includes first and second arms 124, 122. First arm 124 is coupled to base layer 110 and second arm 122 is coupled to beam layer 114. In a particular embodiment, first arm 124 is coupled to base layer 110 by a stem portion 134, and second arm is coupled to beam layer 114 by a stem portion 132. First and second arms 122 and 124 are coupled together, in one embodiment by a coupling portion 126. Arms 122 and 124, as well as stem portions 132, 134 and coupling portion 126 each may comprise a wide range of materials, including polysilicon and the like.

In one embodiment, arms 122 and 124 each have a thickness 102 between about 0.5 microns and about 2.0 microns. In a particular embodiment, each arm 122, 124 is about 1 micron thick. In one embodiment, arms 122, 124 each have a width 104 that is between about one (1) micron and about ten (10) microns, and in a particular embodiment width 104 is about five (5) microns. In some embodiments, arms 122, 124 are between about ten (10) microns and about seventy (70) microns in length. In one embodiment, when apparatus 100 is in a non-rotated state, arms 122, 124 are separated by a gap 136 that is between about one (1) microns and about five (5) microns. As will be appreciated by those skilled in the art, the particular dimensions, spacing and shape of arms 122 and 124 will depend in part upon the particular application for apparatus 100, and are not limited to that shown in FIGS. 1A–1F.

In one embodiment, as shown in FIG. 1A, apparatus 100 includes two flexure assemblies 120. In a particular embodiment, the two flexure assemblies 120 are disposed near opposite edges of beam layer 114. In such a configuration, flexure assemblies 120 maintain a stable platform for beam layer 114 while permitting appropriate rotation as described herein. It will be appreciated by those skilled in the art that additional flexure assemblies 120 also may be used with apparatus 100, depending, in part, on the size of beam layer 114.

By forming flexure assembly 120 as shown in FIGS. 1A–1C, the flexure length is increased, resulting in a more flexible flexure assembly 120. Further, the shape and configuration of flexure assembly 120 helps provide a counter rotation force as described in conjunction with later figures. In some embodiments, flexure assembly(ies) 120 are coupled to beam layer 114 near an approximate center of width 116. In this manner, beam layer 114 rotates about its approximate center instead of about one fixed end such as with a cantilever beam. Such a configuration helps reduce or avoid deformations of beam layer 114 when beam layer 114 is rotated. In this manner, the beam layer upper surface can remain generally flat or planar when apparatus 100 is actuated. Further, apparatus 100 provides for greater compliance for relatively large rotation angles.

FIG. 1B depicts apparatus 100 in a non-rotated state. The reflective surface of beam layer 114, shown as upper surface 108 in FIG. 1A, is substantially planar when apparatus is in a non-rotated state. In one embodiment, upper surface 108 is planarized to facilitate desired reflective properties. Planarization of surface 108 may be performed using a chemical mechanical polishing (CMP), flip-chip assembly, planarized-by-design (PBD), or other techniques. As shown in FIG. 1B, upper surface 108 further may be generally parallel to the base layer upper surface when apparatus 100 is in a non-rotated state. In a particular embodiment, arms 122 and 124 are generally parallel when apparatus 100 is in a non-rotated state.

Figure 1D:
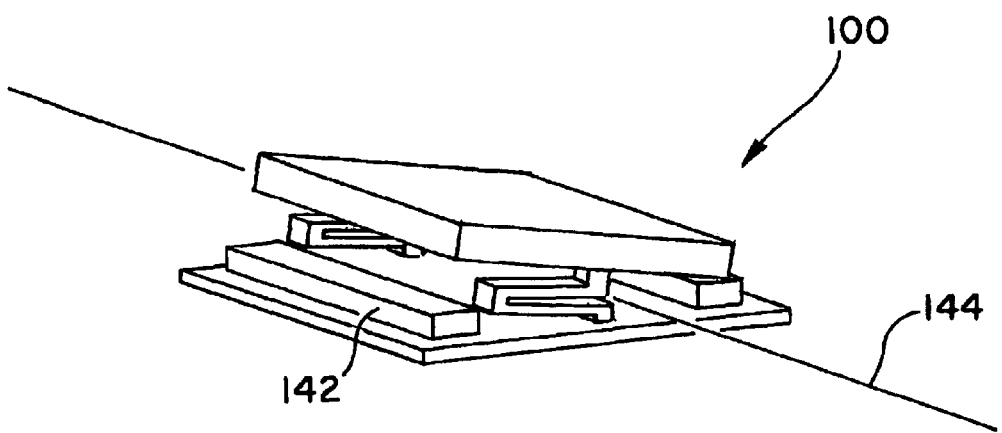
FIG. 1D is a simplified overall view of the apparatus of FIG. 1A in an actuated position.

Apparatus 100 may be used to direct light or other electromagnetic energy in one or more directions by rotating beam layer 114 with the help of flexure assembly 120. In a particular embodiment, apparatus 100 rotates in a binary manner. As shown in FIG. 1D, beam layer 114 is configured to rotate about an axis of rotation 144. While axis of rotation 144 is shown as a single axis in FIG. 1D, it will be appreciated by those skilled in the art that the rotational movement of beam layer 114 need not revolve about a fixed axis. Instead, the rotation of beam layer 114 as described below may involve some axial translation of beam layer 114 as well as a rotational movement.

In one embodiment, apparatus 100 includes first and second electrodes 148 and 150. Electrodes 148 and 150 may comprise a portion of base layer 110. In an alternative embodiment, electrodes 148 and 150 comprise an additional layer laid over base layer 110. Electrodes 148 and 150 comprise an electrically conductive material, such as polysilicon, metals, and the like. Electrodes 148 and 150 run the full width 118 underlying beam layer 114 in an embodiment, or some smaller portion of width 118 in other embodiments. Preferably, beam layer 114 further includes an electrically conductive material to facilitate beam layer 114 rotation by applying a voltage between beam layer 114 and the desired electrode 148, 150.

Figure 1E:
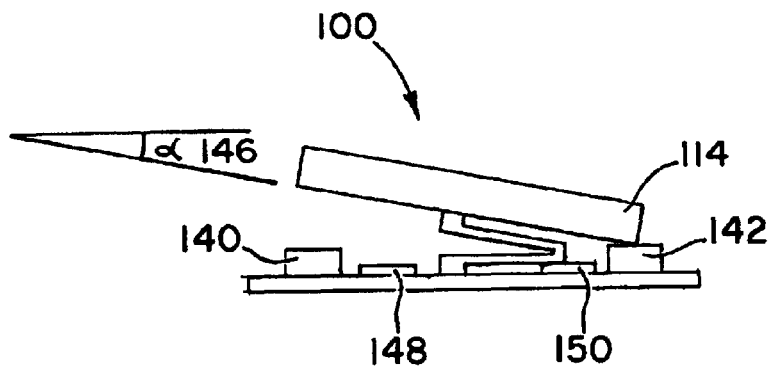
FIGS. 1E and 1F are simplified side views of the apparatus of FIG. 1A, in positive and negative actuated positions.
Figure 1F:
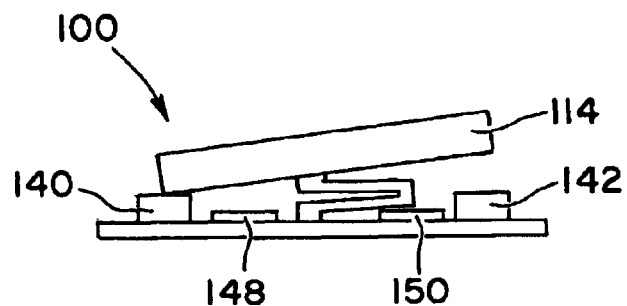

For example, in one embodiment, the rotation shown in FIG. 1E is effectuated by applying a voltage between beam layer 114 and electrode 150. In one embodiment, only electrode 150 is activated to facilitate the rotation shown in FIG. 1E. In an alternative embodiment, an appropriate voltage is applied to electrode 148 to provide the rotation as shown in FIG. 1E. In still another embodiment, appropriate voltages are applied to both electrodes 148 and 150 to facilitate rotation shown in FIG. 1E. Similar voltage applications are applicable to provide the rotation as shown in FIG. 1F. For example, in one embodiment the rotation shown in FIG. 1F is accomplished by applying an appropriate voltage between beam layer 114 and electrode 148.

Beam layer 114 rotates about axis 144 by an angle 146 as shown in FIG. 1E. In a particular embodiment, angle 146 ranges from about one (1) degree to about thirty (30) degrees. In another embodiment, angle 146 ranges from about plus or minus one (±1) degree to about plus or minus thirty (±30) degrees. In one embodiment, angle 146 is limited by the amount beam layer 114 can travel until an underlying edge or corner of beam layer 114 contacts base layer 110. As can be seen in FIGS. 1E and 1F, in one embodiment the rotation of beam layer 114 causes arms 122 and 124 to be in a non-parallel arrangement.

In another embodiment as shown in FIGS. 1A–1F, base layer 110 further includes first and second raised portions 140 and 142. Raised portions 140 and 142 operate as mechanical stops to limit the distance of travel or rotation of beam layer 114. In this manner, the underlying edge or corner of beam layer 114 contacts stops 140 and 142. In a particular embodiment, as best seen in FIG. 1A, stops 140 and 142 extend substantially a full length 118 of beam layer 114. It will be appreciated, however, by those skilled in the art that stops 140 and 142 may extend only a portion of the distance along length 118. Raised portions 140 and 142 may comprise electrically conductive or nonconductive materials, including, silicon, polysilicon, dielectrics or the like. In a particular embodiment, stops 140 and 142 comprise silicon nitride or silicon dioxide over a raised base portion. The location and height of stops 140 and 142, in one embodiment, limit the rotation of beam layer 114.

In some embodiments, flexure assemblies 120 of the present invention operate to facilitate rotation of beam layer 114 while simultaneously providing a counter rotation force to beam layer 114. In this manner, the counter rotation force operates to prevent or minimize the likelihood beam layer 114 would remain stuck in an actuated position when the voltage applied to electrodes 148 and/or 150 is removed. In this manner, flexure assemblies 120 according to the present invention, help beam layer 114 return to the non-activated state shown in FIG. 1B.

Apparatus 100 of the present invention may be manufactured by a variety of techniques, including, micromachining, photolithography and etching processes, and the like. In one embodiment, appropriate layers of materials such as polysilicon, metals, dielectrics and the like, are formed, oxidized and/or deposited on base layer 110 and selectively removed to formed the desired apparatus 100. For example, electrodes 148 and 150 may comprise two physically and electrically isolated portions formed from a single conductive layer. Similarly, raised portions 140 and 142 may be made from the same conductive or non-conductive layer deposited and formed on base layer 110.

Turning now to FIGS. 2A–2F another embodiment of a light steering apparatus according to the present invention will be described. Again, the apparatus may be used as part of optical switches, display devices, signal modulators and the like.

Figure 2A:
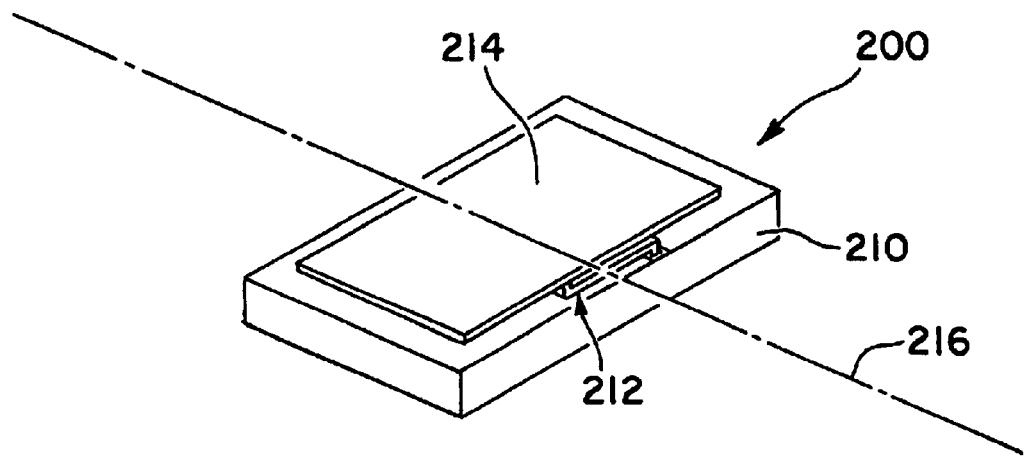
FIG. 2A is a simplified overall view of a light steering apparatus according to an embodiment of the present invention.

As shown in FIG. 2A, an apparatus 200 includes a beam layer or reflective layer 214. Beam layer 214, which is similar to beam layer 114, is used to reflect electromagnetic energy, such as light, in optical switches, optical routers, and the like. Preferably, beam layer 214 includes a reflective surface and is made from a wide range of materials depending, in part, on the particular application. In one embodiment, beam layer 214 comprises gold, silver, chromium, aluminum, combinations thereof, and the like. In another embodiment, beam layer 214 comprises polysilicon. In one embodiment, reflective layer 214 has a width 222 ranging from about twenty-five (25) microns to about one hundred and fifty (150) microns, and a length 224 ranging from about twenty-five (25) microns to about one hundred and fifty (150) microns.

Apparatus 200 includes a base layer 210. Similar to base layer 110, base layer 210 may comprise nitride, such as silicon nitride, and the like. In one embodiment, base layer 210 comprises a substrate, such as a silicon substrate, overlaid with an oxide layer, such as a thermal oxide layer, over which is laid a layer of silicon nitride (together shown as base layer 210 in the Figures).

Figure 2B:
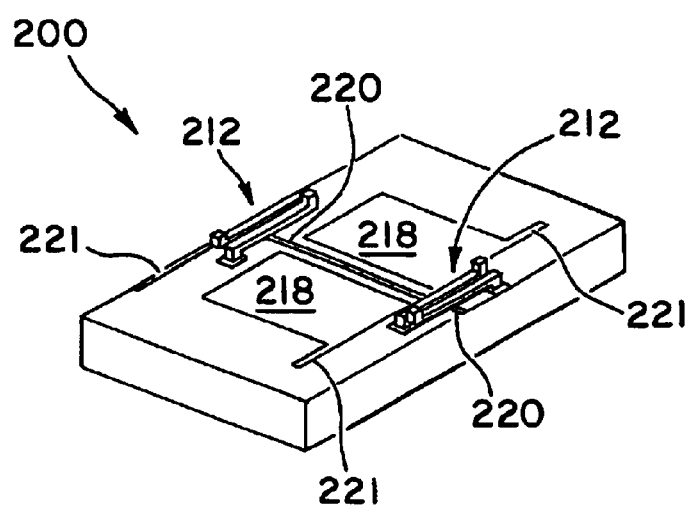
FIG. 2B is a simplified overall view of the apparatus of FIG. 2A, with the beam or reflective layer removed.
Figure 2C:
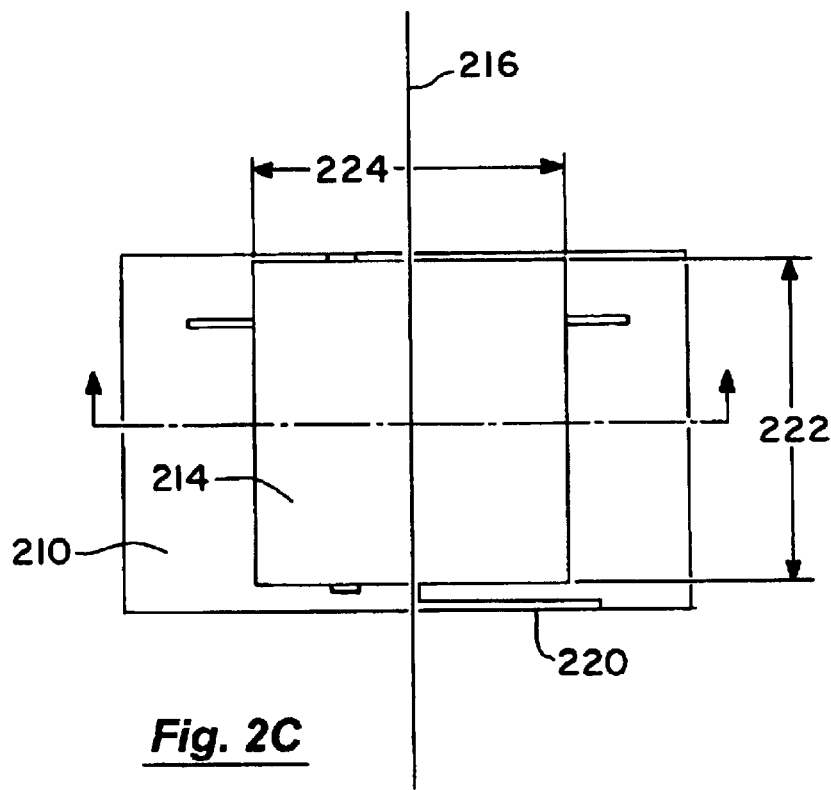
FIG. 2C is a top view of the apparatus of FIG. 2A.

Base layer 210 provides a base onto which additional components and layers may be formed. As shown in FIG. 2B, electrodes 218 are formed on a surface of base 210. In one embodiment, electrodes 218 comprise two physically and electrically isolated portions of a single conductive layer. In this manner, voltages may be applied to one or both electrodes 218. Apparatus 200 further includes a flexure assembly 212 as shown in FIG. 2B and further described in conjunction with later figures. Flexure assembly 212 facilitates rotation of beam layer 214 about an axis of rotation 216 as shown in FIGS. 2A and 2C. According to the present invention, flexure assembly 212 further imparts a counter rotation force to beam layer 214. The counter rotation force operates, in one embodiment, to prevent the beam layer from sticking to the base 210 surface or electrodes 218, or one or more stops (not shown) similar to stops 140, 142.

While the axis of rotation 216 for beam layer 214 is shown as a single axis in FIGS. 2A and 2C, it will be appreciated by those skilled in the art that the rotational movement of beam layer 214 need not revolve about a fixed axis. Instead, the rotation of beam layer 214 as described below may involve some axial translation of beam layer 214 as well as a rotational movement.

As shown in FIG. 2B, a ground plate 220 is disposed on base layer 210. In one embodiment, ground plate 220 comprises a ground rod disposed between the two electrically isolated electrodes 218. In one embodiment, as can be seen in FIG. 2B, ground plate 220 and electrodes 218 have an extension portion 221 which facilitates the coupling of the components to a voltage source or sources (not shown).

Figure 2D:
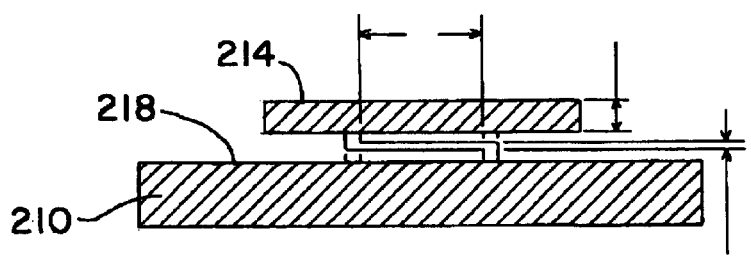
FIGS. 2D and 2E are simplified side views of the apparatus of FIG. 2A, in a non-rotated state and a rotated position, respectively.
Figure 2E:
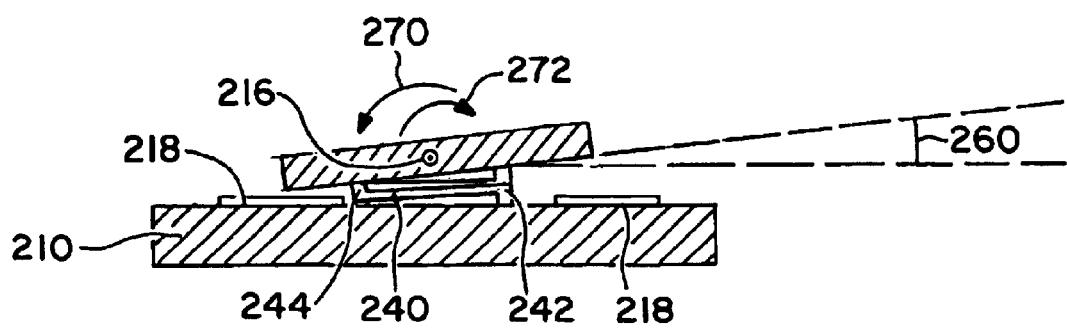

In conjunction with FIGS. 2D and 2E, the rotational operation of apparatus 200 will be described. FIG. 2D depicts apparatus 200 in a non-activated state. In such a manner, the upper surface of beam layer 214 is substantially planar, and in one embodiment is substantially parallel to the upper surface of base 210. The application of a voltage to electrode 218 causes beam layer 214 to be attracted to electrode 218, with the movement or rotation of beam layer 214 indicated by an arrow 270 in FIG. 2E. In one embodiment, one or more stops (not shown) are positioned to limit the range of motion or rotation of beam layer 214. In one embodiment, only the left most electrode 218 is activated to facilitate the rotation shown in FIG. 2E. In another embodiment, an appropriate voltage is applied to the right electrode to provide the rotation as shown in FIG. 2E. In a particular embodiment, appropriate voltages are applied to both electrodes 218 to facilitate rotation as shown by arrow 270.

Beam layer 214 rotates through an angle 260 as shown by FIG. 2E. In one embodiment, angle 260 is limited to the rotational distance of beam layer 214 available until an underlying edge or corner of beam layer 214 contacts a stop (not shown), or contacts an upper surface of base layer 210. In a particular embodiment, angle 260 ranges from about one degree (1°) to about thirty degrees (30°). In another embodiment, angle 260 ranges from about minus one degree (−1°) to about minus thirty degrees (−30°). Such a rotation may, for example, also comprise rotation of beam layer 214 in a direction opposite that shown by arrow 270, and may not necessarily result in beam layer 214 contacting base 210, or electrodes 218, or the stops.

Flexure assemblies 212 according to the present invention operate to both facilitate rotation of beam layer 214 while simultaneously providing a counter rotation force to beam layer 214 as shown by arrow 272 in FIG. 2E. In this manner, the counter rotation force 272 operates to prevent beam layer 214 from remaining in a stuck or actuated position, such as that shown in FIG. 2E, when the voltage applied to electrode 218 is removed. In one embodiment, FIG. 2D shows a neutral or non-activated state of apparatus 200, and FIG. 2E depicts one possible activated state of apparatus 200. It will be appreciated by those skilled in the art that some prior art devices have problems with the beam layer sticking in the activated position due to surface tension and other forces between the beam layer and the electrode or base layer. Flexure assemblies 212 according the present invention minimize or prevent beam layer 214 from remaining stuck in an activated position, and allows beam layer 214 to return to a non-activated state.

Figure 2F:
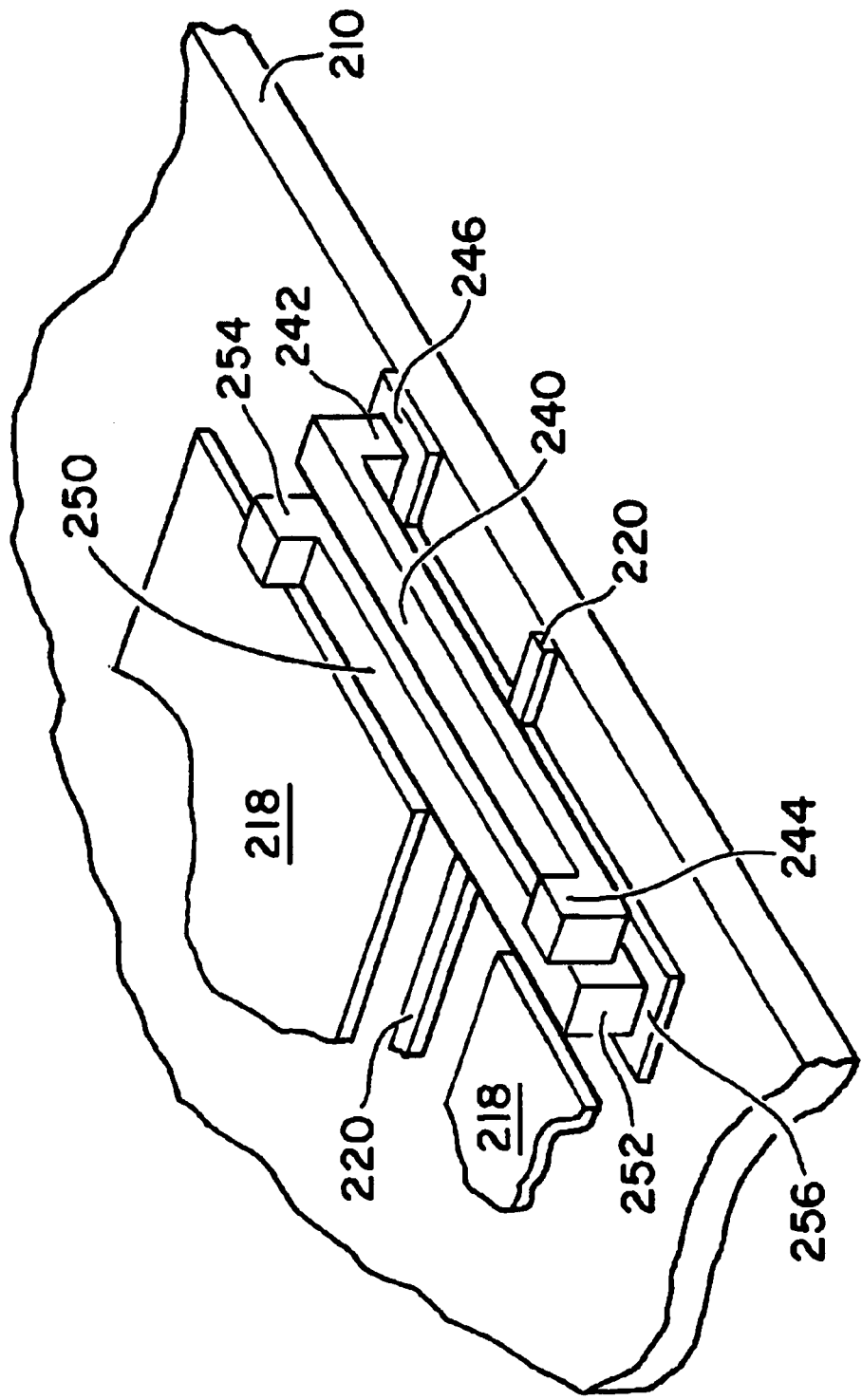
FIG. 2F is a close-up view of a flexure assembly according to an embodiment of the present invention.

Turning now to FIG. 2F additional details of flexure assembly 212 will be described. In one embodiment, flexure assembly 212 comprises two substantially parallel arms 240 and 250. In one embodiment, arms 240 and 250 each have a thickness between about 0.5 microns and about 2.0 microns. In a particular embodiment, arms 240, 250 are about 1.0 micron thick, and about twenty (20.0) microns in length. As will be appreciated by those skilled in the art, the particular thickness, length and shape of arms 240, 250 will depend in part upon the particular application for flexure assembly 212.

Each arm is coupled to a lower stem portion 242, 252, which are in turn coupled to a base plate 246, 256. In an alternative embodiment, stems 242, 252 are coupled directly to base layer 210. Each arm further includes an upper stem portion 244, 254, to which beam layer 214 is coupled. In this embodiment, ground plate 220 passes under both arms 240 and 250. Plate 220 may or may not contact the under surface of arms 240 or 250.

During rotation of base layer 214 as shown in FIG. 2E, upper stem portion 244 rotates downward with the left most portion of beam layer 214. Similarly, the upper stem portion 254 rotates upward with beam layer 214. In one embodiment, arms 240 and 250 are formed such that the generally parallel orientation is the neutral or non-activated state. Arms 240 and 250 provide a counter rotation force as shown by arrow 272 when rotated according to arrow 270. In this manner, flexure assembly 212 provides a counter rotation force generally opposite the rotation created by electrode 218.

In one embodiment, as shown in FIG. 2B, flexure assembly 212 comprises two sets of generally parallel arms 240 and 250. In a particular embodiment, the two sets of arms are disposed on opposite sides of electrodes 218. In such a configuration, the flexure assembly maintains a stable platform for beam layer 214 while permitting appropriate rotation as described herein.

Turning now to FIGS. 3A–3H and 4A–4H, a method of manufacturing apparatus 200 according to the present invention will be described. It will be appreciated by those skilled in the art that the below described method comprises one of a large number of methods which may be used to form apparatus according to the present invention. In general, FIGS. 4A–4H depict top views corresponding to the side views shown in FIGS. 3A–3H. FIGS. 3A–4H, inclusive, are not necessarily to scale.

Figure 3A:
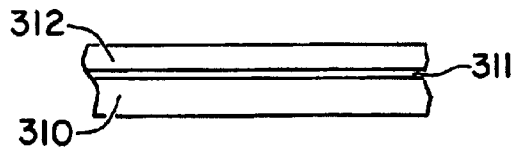
FIGS. 3A–3H are selective side views of various process steps according to one embodiment for forming apparatus of the present invention.
Figure 4A:
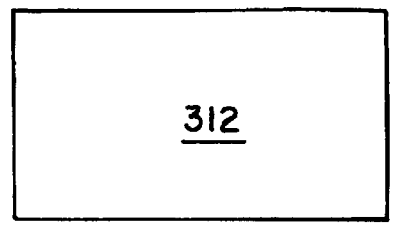
FIGS. 4A–4H are selective top views of the various process steps corresponding to FIGS. 3A–3H.
Figure 3B:
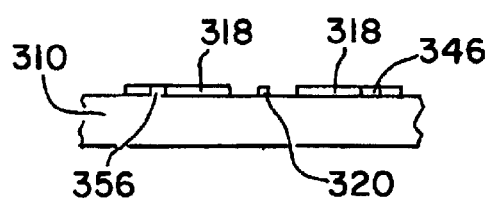
Figure 4B:
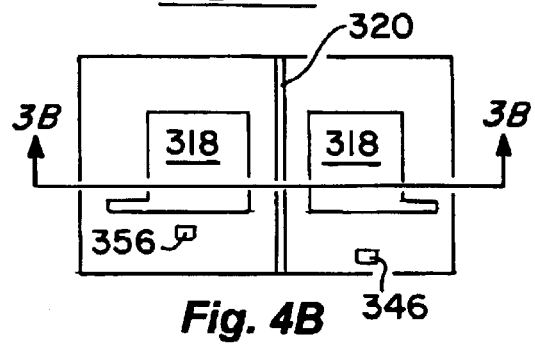

As shown in FIG. 3A, a base layer 310, similar to base layer 210, is provided. In one embodiment, a dielectric layer 311 is formed over some or all of base layer 210, and a conductive layer 312 is formed over some or all of dielectric layer 311. Conductive layer 312 may comprise metals, polysilicon, and the like. In a particular embodiment, conductive layer 312 is formed using CVD or other desirable processes. Conductive layer 312 is used to form electrodes 318, ground plate 320, and base plates 346 and 356 as shown in FIGS. 3B and 4B. The formation of such elements may be accomplished using micromachining, photolithography and etching processes, and the like. In one embodiment, a photoresist pattern is formed overlying conductive layer 312 having an opening therethrough to expose the portions of conductive layer 312 that lie between the to-be-formed electrodes 318, ground plate 320, and base plates 346, 356. An etch process then removes portions of conductive layer 312 to create the underlying structures as shown in FIGS. 3B and 4B.

Figure 3C:
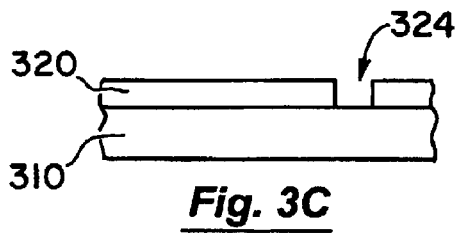
Figure 4C:
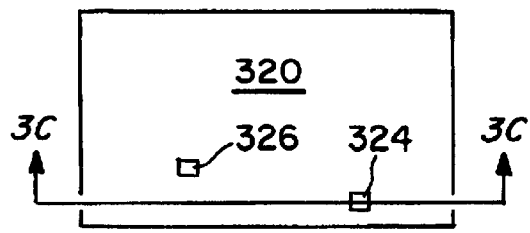
Figure 3D:
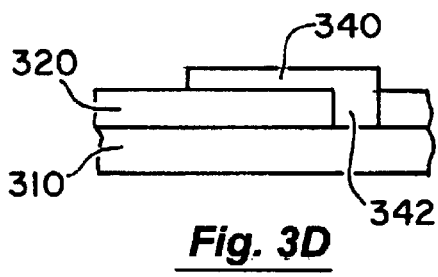
Figure 4D:
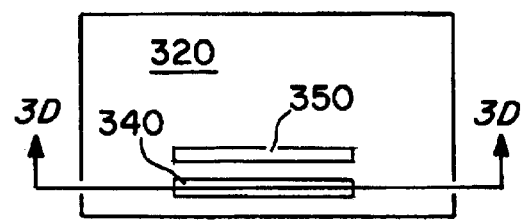

As shown in FIGS. 3C and 4C, a first sacrificial layer 320 is formed overlying base layer 310 and over the newly formed electrodes 318, base plates 346, 356, and ground plate 320. Sacrificial layer 320 may comprise an oxide, such as silicon dioxide, and may be formed by thermal oxidation, CVD, or other processes. In another embodiment, sacrificial layer 320 comprises a conductive material. Again, using micromachining, photolithography and etching processes, and the like, openings are formed within sacrificial layer 320 to correspond in location to lower stems 242 and 252 of apparatus 200. In this embodiment, the openings are shown as openings 324 and 326. Thereafter, a second conductive layer is deposited to substantially fill openings 324 and 326, and overlie sacrificial layer 320. The second conductive layer is then patterned to form arm 340 coupled to lower stem portion 342. Similarly, as seen in FIG. 4D, second arm 350 is formed having a lower stem (not shown). In one embodiment, arm 340 has a thickness of about 0.5 microns to about 2.0 microns. In another embodiment, arm 340 has a thickness of about 1.0 micron.

Figure 3E:
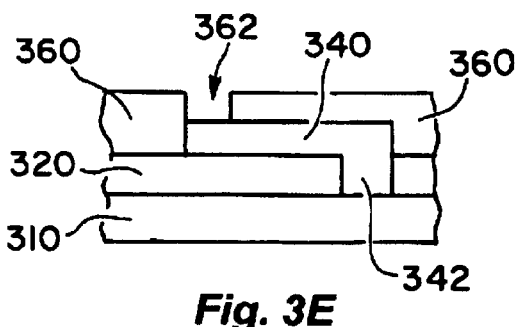
Figure 4E:
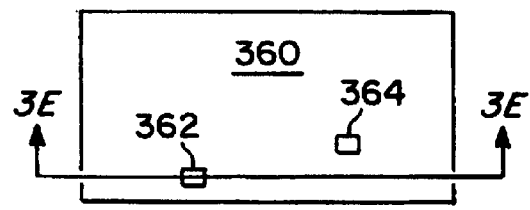
Figure 3F:
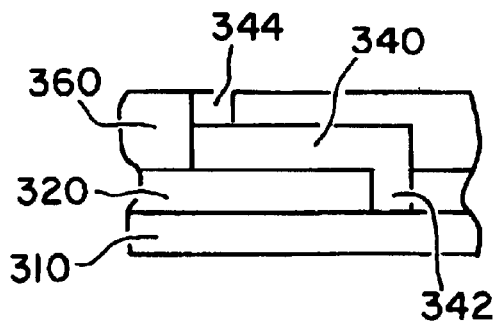
Figure 4F:
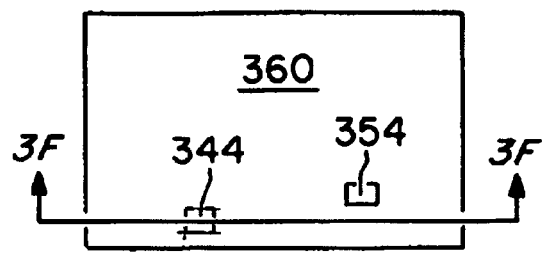

As shown in FIGS. 3E and 4E, a second sacrificial layer 360 is formed overlying first sacrificial layer 320, arm 340 and arm 350. Openings 362 and 364 are formed within sacrificial layer 360 (FIG. 4E). A second conductive layer is formed overlying the structure of FIGS. 3E and 4E to substantially fill openings 362 and 364. The second conductive layer, forms upper stems portions 344 and 354 of the flexure assembly. (FIGS. 3F and 4F). In one embodiment, the formation of second conductive layer results in the second conductive layer extending over a portion of sacrificial layer 360. The second conductive layer is then planarized to produce the configuration shown in FIG. 3F.

Figure 3G:
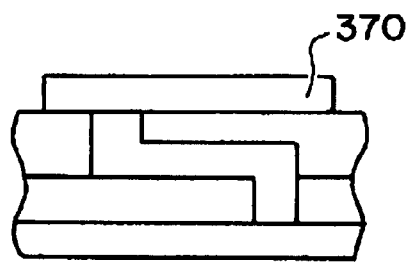
Figure 4G:
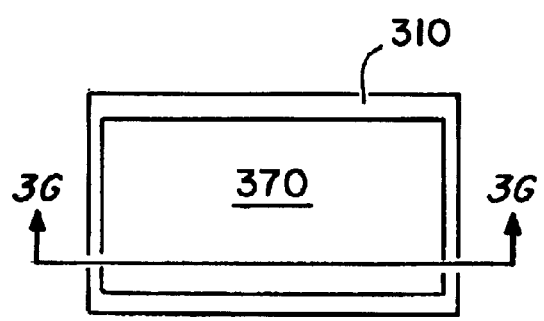
Figure 3H:
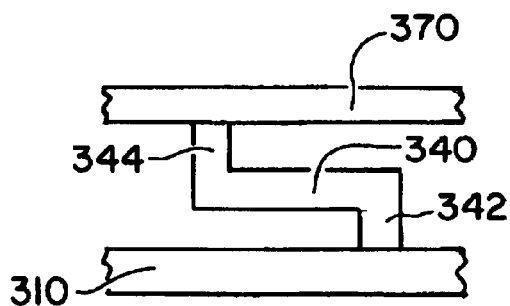
Figure 4H:
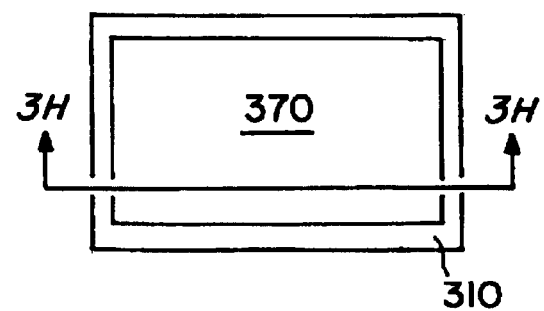

A beam or reflective layer 370 is thereafter formed overlying the structure of FIG. 3F to produce the structure shown in FIGS. 3G and 4G. In one embodiment, beam layer 370 has a thickness ranging from about one (1) micron to about ten (10) microns. In a particular embodiment, beam layer 370 is about 5.0 microns thick. Again, the formation of beam layer 370 may result in the incomplete coverage of base layer 310 and a subsequent etching or other process to form beam layer 370 into the desired configuration. Once beam layer 370 has been formed, the sacrificial layers are removed as shown in FIGS. 3H and 4H. In one embodiment, sacrificial layers 320 and 360 are removed in an etchant bath comprising hydroflouric acid (HF), or the like. Alternatively, sacrificial layers may be removed using dry etching or other techniques known to those skilled in the art. In still another embodiment, some or all of the sacrificial layers, or portions thereof, may be removed earlier in the device formation process.

In one embodiment, prior to beam layer 214, 370 formation, the uppermost layers of apparatus 200 are planarized. Planarization may take place using a chemical mechanical polishing (CMP), flip-chip assembly, planarized-by-design (PBD), or other techniques. In some embodiments, additional planarization steps are employed between some or all layer deposition or formation processes. In one embodiment, beam layer 214 or 370 is a single crystal silicon.

As a result of the processes described in FIGS. 3 and 4, a flexure assembly such as that shown in FIG. 2F may be created. Preferably, flexure assembly 212 is comprised of material which permits the bending, but not the breakage of arms 240 and 250.

Figure 5A:
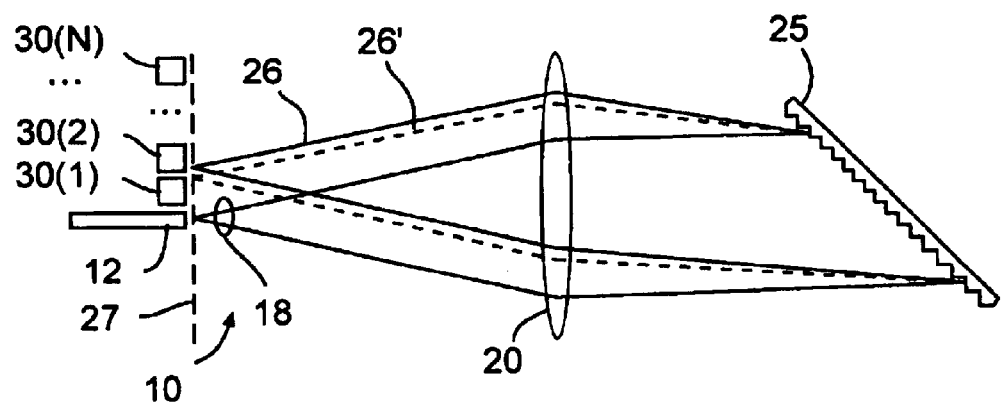
FIGS. 5A, 5B and 5C are schematic top, side and end views, respectively, of a wavelength router for use with an embodiment of the invention.
Figure 5B:
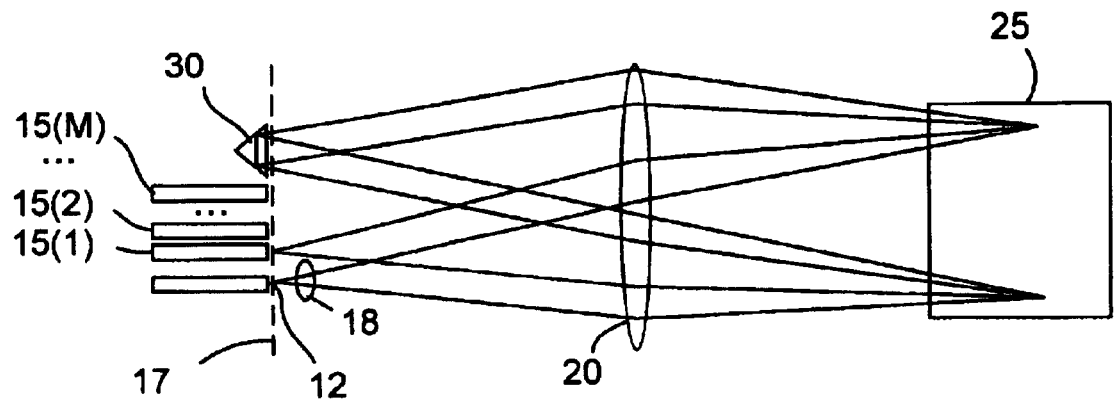
Figure 5C:
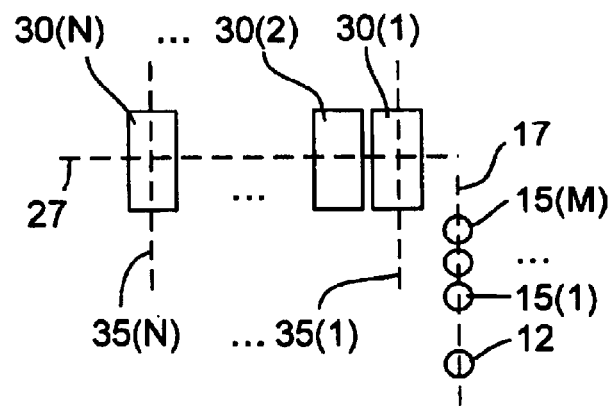

Turning now to FIGS. 5A–5C, details on a wave length router which, in one embodiment, incorporates apparatus 100 and/or apparatus 200 of the present invention will be described. For example, apparatus 100 and/or 200 may be used as retroreflectors 30 in the router depicted in FIGS. 5A–5C.

The general functionality of a wavelength router is to accept light having a plurality of spectral bands (i.e., "N" spectral bands) at an input port, and selectively direct subsets of the spectral bands to desired ones of a plurality of output ports (i.e., "M" output ports). The routers may include dynamic switching where the routing mechanism includes one or more routing elements whose state can be dynamically changed in the field to effect switching. The routers may also include static embodiments in which the routing elements are configured at the time of manufacture or under circumstances where the configuration is intended to remain unchanged during prolonged periods of normal operation.

The routers may include a dispersive element, such as a diffraction grating or a prism, which operates to deflect incoming light by a wavelength-dependent amount. Different portions of the deflected light are intercepted by different routing elements. Although the incoming light could have a continuous spectrum, adjacent segments of which could be considered different spectral bands, it is generally contemplated that the spectrum of the incoming light will have a plurality of spaced bands.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. In many cases, light will diverge as it enters the wavelength router after passing through the input port, and will converge within the wavelength router as it approaches the output port. However, this is not necessary.

The International Telecommunications Union (ITU) has defined a standard wavelength grid having a frequency band centered at 193,100 GHz, and another band at every 100 GHz interval around 193,100 GHz. This corresponds to a wavelength spacing of approximately 0.8 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 50 GHz (corresponding to wavelength spacings of approximately 0.2 nm and 0.4 nm) are also of interest.

One particular embodiment of a wavelength router 10 is illustrated in FIGS. 5A, 5B and 5C. This embodiment is included to illustrate the basic principals of operation of one type of wavelength router as described generally in copending U.S. application Ser. No. 09/422,061, previously incorporated by reference. However, the invention is not intended to be limited only to such an embodiment.

FIGS. 5A, 5B, and 5C are schematic top, side, and end views, respectively, of a wavelength router 10. The general functionality of wavelength router 10 is to accept light having a plurality of spectral bands at an input port 12, and selectively direct subsets of the spectral bands to desired ones of a plurality of output ports, designated 15(1 ... M). The output ports are shown in the end view of FIG. 5C as disposed along a line 17 that extends generally perpendicular to the top view of FIG. 5A. The input and output ports are shown as communicating with respective input and output optical fibers, but it should be understood that the input port could also receive light directly from a light source, and the output ports could be coupled directly to optical detectors. The drawing is not to scale.

Light entering wavelength router 10 from input port 12 forms a diverging beam 18, which includes the different spectral bands. Beam 18 encounters a lens 20 which collimates the light and directs it to a reflective diffraction grating 25. Grating 25 disperses the light so that collimated beams at different wavelengths are directed at different angles back towards lens 20. Two such beams are shown explicitly and denoted 26 and 26' (the latter drawn in dashed lines). Since these collimated beams encounter the lens at different angles, they are focused at different points along a line 27 in a transverse focal plane. Line 27 extends in the plane of the top view of FIG. 5A.

The focused beams encounter respective ones of plurality of retroreflectors, designated 30(1 ... N), located near the focal plane. The beams are directed, as diverging beams, back to lens 20. Each retroreflector sends its intercepted beam along a reverse path that may be displaced in a direction perpendicular to line 27.

More specifically, the beams are displaced along respective lines 35(1 ... N) that extend generally parallel to line 17 in the plane of the side view of FIG. 5B and the end view of FIG. 5C.

In one particular embodiment shown, the displacement of each beam is effected by moving the position of the retroreflector along its respective line 35(i). In other embodiments, to be described below, the beam displacement is effected by a reconfiguration of the retroreflector. It is noted that the retroreflectors are shown above the output ports in the plane of FIG. 5C, but this is not necessary; other relative positions may occur for different orientations of the grating or other elements.

The beams returning from the retroreflectors are collimated by lens 20 and directed once more to grating 25. Grating 25, on the second encounter, removes the angular separation between the different beams, and directs the collimated beams back to lens 20, which focuses the beams. However, due to the possible displacement of each beam by its respective retroreflector, the beams will be focused at possibly different points along line 17. Thus, depending on the positions of the retroreflectors, each beam is directed to one or another of output ports 15(1 ... M).

In sum, each spectral band is collimated, encounters the grating and leaves the grating at a wavelength-dependent angle, is focused on its respective retroreflector such that is displaced by a desired amount determined by the retroreflector, is collimated again, encounters the grating again so that the grating undoes the previous dispersion, and is focused on the output port that corresponds to the displacement imposed by the retroreflector. In the embodiment described above, the light traverses the region between the ports and the grating four times, twice in each direction.

The invention has now been described in detail for purposes of clarity and understanding. However, it will be appreciated that certain changes and modifications may be practiced within the scope of the appended claims. For example, while FIGS. 1A–1F depict a single apparatus 100 and FIGS. 2–4 generally describe a single apparatus 200, the present invention further anticipates the formation of more than one apparatus 100, 200. For example, an array of apparatus 100, 200 may be formed on the same base layer 110, 210 or different base layers 110, 210. The array, which may or may not be symmetrical in number, may contain tens, hundreds and even thousands of apparatus 100 and/or apparatus 200.

What is claimed is:

1. An apparatus for steering light, comprising:
   a base layer;
   a folded flexure assembly coupled to said base layer and completely underlying a beam layer;
   said beam layer overlying and coupled to said folded flexure assembly, said beam layer adapted to rotate relative to said base layer; and
   wherein said folded flexure further comprises:
      a first arm coupled to said base layer; and
      a second arm coupled to said beam layer;
         wherein said first and second arms are coupled together, with said coupled portion of said first and second arms disposed between said beam layer and said base layer.

2. The apparatus as in claim 1 wherein said base layer further comprises first and second electrically conductive portions that are physically and electrically isolated from each other.

3. The apparatus as in claim 2 wherein said first electrically conductive portion is coupled to a voltage source, said beam layer adapted to rotate when a voltage is applied to said first electrically conductive portion.

4. The apparatus as in claim 1 wherein said beam layer comprises a substantially planar upper surface adapted to reflect electromagnetic energy.

5. The apparatus as in claim 1 wherein said first and second arms are substantially parallel to each other when said beam layer is in a non-rotated state.

6. The apparatus as in claim 1 wherein said first and second arms are in a non-parallel alignment when said beam layer is in a rotated state.

7. The apparatus as in claim 1 wherein said folded flexure assembly further comprises a second pair of said first and second arms.

8. The apparatus as in claim 1 wherein said beam layer comprises an electrically conductive material.

9. The apparatus as in claim 1 wherein the beam layer is adapted to rotate about an axis of rotation, and wherein the coupled portion of the first and second arms is disposed on a first side of the axis of rotation.

10. The apparatus as in claim 9 wherein the first arm is coupled to the base layer and the second arm is coupled to the beam layer on a second side of the axis of rotation.

11. An apparatus for steering light, comprising:
   a base layer;
   a folded flexure assembly coupled to said base layer and completely underlying a beam layer;
   said beam layer overlying and coupled to said folded flexure assembly, said beam layer adapted to rotate relative to said base layer; and
   further comprising spaced apart first and second raised portions coupled to said base layer, said beam layer adapted to contact said first raised portion when rotated in a first direction and adapted to contact said second raised portion when rotated in a second direction.

12. The apparatus as in claim 11 wherein said first and second raised portions each extend substantially a full width of said base layer.

13. The apparatus as in claim 11 wherein said first and second raised portions are positioned to define the maximum angle of rotation in said first direction and in said second direction, respectively.

14. The apparatus as in claim 11 wherein said folded flexure assembly is adapted to provide a restoring force to said beam layer when said beam layer is in a rotated state, said restoring force of sufficient strength to prevent said beam layer from sticking to said first and second raised portions.

15. An apparatus for steering light, comprising:
   a base layer;
   a folded flexure assembly coupled to said base layer and completely underlying a beam layer;
   said beam layer overlying and coupled to said folded flexure assembly, said beam layer adapted to rotate relative to said base layer; and
   wherein said folded flexure assembly is adapted to provide a restoring force to said beam layer when said beam layer is in a rotated state.

16. The apparatus as in claim 15 wherein said restoring force is of sufficient strength to prevent said beam layer from sticking to said base layer.

17. An apparatus for steering light, comprising:
   a base layer;
   a folded flexure assembly coupled to said base layer and completely underlying a beam layer;
   said beam layer overlying and coupled to said folded flexure assembly, said beam layer adapted to rotate relative to said base layer; and
   wherein said beam layer has a non-rotated state and a rotated state defining an angle therebetween, said angle ranging between about ±1 degree and about ±30 degrees.

18. An apparatus for steering light, comprising:
   a base layer comprising an electrode;
   a reflective layer;
   a flexure assembly coupled to and between said base layer and said reflective layer;
   wherein said reflective layer rotates relative to said base layer; and
   wherein said flexure assembly comprises:
      a first arm coupled to said base layer; and
      a second arm coupled to said beam layer;
         wherein said first and second arms are coupled together, with said coupled portion of said first and second arms disposed between said beam layer and said base layer;
      wherein said flexure assembly is adapted to permit an electrode-induced rotation of said beam layer when a voltage is applied to said electrode, said flexure assembly further providing a counter-rotation force generally opposite said electrode-induced rotation.

19. The apparatus as in claim 18 wherein said counter-rotation force prevents said beam layer from remaining in a rotated state when said voltage is removed.

20. An apparatus for steering light, comprising:
   a base layer;
   a flexure assembly coupled to said base layer; and
   a beam layer overlying and coupled to said flexure assembly, said beam layer adapted to rotate relative to said base layer;
   wherein said flexure assembly is adapted to impart a counter rotation force when said beam layer rotates.

21. The apparatus as in claim 20 further comprising a conductive layer overlying a portion of said base layer, said conductive layer having first and second portions that are physically and electrically isolated.

22. The apparatus as in claim 20 wherein said beam layer comprises a substantially planar upper surface adapted to reflect electromagnetic energy.

23. The apparatus as in claim 20 wherein said beam layer rotates about an axis of rotation, and said flexure assembly further comprises:
- a first arm coupled to said base layer on a first side of said axis of rotation and coupled to said beam layer on a second side of said axis of rotation; and
- a second arm coupled to said base layer on said second side of said axis of rotation and coupled to said beam layer on said first side of said axis of rotation.

24. The apparatus as in claim 23 wherein said arms are substantially parallel to each other when said beam layer is in a non-rotated state.

25. The apparatus as in claim 23 wherein said flexure assembly further comprises a second pair of said first and second arms.

26. The apparatus as in claim 20 wherein said conductive layer first portion is coupled to a voltage source, said beam layer adapted to rotate when a voltage is applied to said conductive layer first portion.

27. The apparatus as in claim 20 wherein said beam layer comprises an electrically conductive material.

28. The apparatus as in claim 20 wherein said beam layer has a non-rotated state and a rotated state defining an angle therebetween, said angle ranging between about one (1) degree and about thirty (30) degrees.

29. The apparatus as in claim 20 wherein said flexure assembly is entirely underlying said beam layer.

30. The apparatus as in claim 20 wherein the beam layer rotates about an axis of rotation, and the flexure assembly further comprises:
- a first arm coupled to the base layer on a first side of the axis of rotation; and
- a second arm coupled to the beam layer on the first side of the axis of rotation;
- wherein the first and second arms are coupled together, the coupled portion disposed on a second side of the axis of rotation.

31. An apparatus for steering light, comprising:
- a base layer;
- first and second spaced apart electrodes overlying said base layer;
- a flexure assembly coupled to said base layer;
- a beam layer coupled to said flexure assembly and overlying said electrodes;
- wherein said flexure assembly is adapted to permit an electrode-induced rotation of said beam layer when a voltage is applied to one of said electrodes, said flexure assembly further providing a counter-rotation force generally opposite said electrode-induced rotation; and
- wherein said counter-rotation force prevents said beam layer from remaining in a rotated state when said voltage is removed,
- wherein said counter-rotation force prevents said beam layer from remaining in a rotated state when said voltage is removed.

32. An apparatus for steering light, comprising:
- a base layer;
- first and second spaced apart electrodes overlying said base layer;
- a flexure assembly coupled to said base layer;
- a beam layer coupled to said flexure assembly and overlying said electrodes;
- wherein said flexure assembly is adapted to permit an electrode-induced rotation of said beam layer when a voltage is applied to one of said electrodes, said flexure assembly further providing a counter-rotation force generally opposite said electrode-induced rotation; and
- wherein said flexure assembly comprises first and second arms coupled to said base layer and said beam layer.

33. The apparatus as in claim 32 wherein said beam layer rotates about an axis of rotation, and wherein:
- said first arm is coupled to said base layer on a first side of said axis of rotation and coupled to said beam layer on a second side of said axis of rotation; and
- said second arm is coupled to said base layer on said second side of said axis of rotation and coupled to said beam layer on said first side of said axis of rotation.

34. A structure for steering light, comprising:
- a base;
- an electrode overlying said base;
- a flexure assembly; and
- a reflective layer coupled to said flexure assembly;
- wherein said flexure assembly is adapted to permit said reflective layer to move into a rotated state when a voltage is applied to said electrode, said rotated state having a portion of said reflective layer contacting said base, and said flexure assembly further preventing said reflective layer from remaining in said rotated state when said voltage is removed.

35. The structure as in claim 34 wherein said flexure assembly comprises first and second arms, said arms being generally parallel to each other when said reflective layer is in a non-rotated state.

36. The structure as in claim 34 wherein said flexure assembly comprises first and second arms, said arms defining a generally X-shaped configuration when said reflective layer is in said rotated state.

37. The structure as in claim 34 wherein said reflective layer rotates about an axis of rotation, said flexure assembly further comprising:
- a first arm coupled to said base on a first side of said axis of rotation and coupled to said reflective layer on a second side of said axis of rotation; and
- a second arm coupled to said base on said second side of said axis of rotation and coupled to said reflective layer on said first side of said axis of rotation.

* * * * *

UNITED STATES PATENT AND TRADEMARK OFFICE
CERTIFICATE OF CORRECTION

PATENT NO. : 6,785,039 B2
DATED : August 31, 2004
INVENTOR(S) : Ronald G. Wendland, Jr.

It is certified that error appears in the above-identified patent and that said Letters Patent is hereby corrected as shown below:

<u>Column 15,</u>
Line 52, should read -- wherein said counter-rotation force prevents said beam layer from remaining in a rotated state when said voltage is removed. --

Signed and Sealed this

Seventh Day of December, 2004

JON W. DUDAS
*Director of the United States Patent and Trademark Office*